Patented Jan. 6, 1948

2,433,861

UNITED STATES PATENT OFFICE 2,433,861

GREASE COMPOSITION

George M. McNulty and John C. Zimmer, Union, N. J., assignors to Standard Oil Development Company, a corporation of Delaware No Drawing. Application December 30, 1944, Serial No. 570,776

9 Claims. (Cl. 252—40.7)

The present invention relates to improved grease compositions, particularly reversible greases which are transparent, mechanically and thermally stable, and adapted for use in "lubricated-for-life" bearings or under conditions where either high temperatures, water contamination or both are encountered. Reversible greases are those grease compositions which can be heated to above their melting point and upon being cooled revert to their original consistency.

Many types of mechanical mechanisms including electrical motors and generators operate at such high speeds that high bearing temperatures are generated or equipment is installed in close proximity to a direct source of heat, which results in the operation of the equipment at high temperatures. If the design of the equipment or its location necessitates the use of a grease as the lubricant, then high temperature creates a difficult lubrication problem. Although not unique in this respect, electrical generators, such as those attached to internal combustion engines for example, aircraft or Diesel locomotives, provide a typical example of the requirement in high temperature lubrication. In their construction these generators contain sealed and lubricated anti-friction bearings, which it is contemplated will not need replacement or relubrication during the life of the generator. When the engines to which these generators are attached are operated over an extended period of time these generators, due to heat radiation, conduction, and other causes, attain temperatures which ordinary greases will not withstand. Circumstances such as these require the use of a high melting point grease, resistant to elevated temperatures. High temperature greases are customarily made using an alkali, such as sodium, and in order to obtain the high melting point required in a high temperature grease, a considerable excess of alkali over that needed to neutralize the fatty acid is commonly employed. High temperature greases containing excess alkali, although they possess the desired high melting point, are deficient in several other respects. They tend to be water-soluble and readily disintegrate in contact with moisture or under humid conditions, and unless proper care is taken in selecting the fatty acid from which the alkali soap is made, evidence a strong tendency to be unstable during storage in that the soap fails to hold the oil in a dispersed state, as manifest by free oil which has separated from the grease. Furthermore, high temperature greases containing an excess of alkali are subject to operational difficulties in that at temperatures above about 180° F. they may become stiff and develop a fibrous structure, and wrap themselves around a rotating shaft and thus be pulled out of its bearing, losing the soft, buttery consistency desired in greases, which operate in bearings running at high speeds. This is particularly so when the grease is prepared from fatty oils or fatty acids containing unsaturated constituents such as oleic or linoleic acid, etc. This tendency of a high temperature alkali grease to change its grease structure at high temperatures can be shown by an irregular resistance to flow under pressure in the range of temperatures above 170° F. up to the melting point of the grease.

Still another instance demanding a grease having both water insolubility and high temperature characteristics is in the lubrication of roll neck bearings employed in steel mill hot rolling equipment. Before being drawn or rolled, steel billets are usually preheated to a temperature of 900° F. or more. Naturally a considerable amount of this heat is transferred to the roll through contact and then by conduction to the roll bearings. Thus temperatures in the neighborhood of 300° F. or more are not uncommon in roll neck bearings. This heat energy is generally dissipated by water cooling the roller and quite naturally some of this water finds its way into the bearing. It is therefore apparent that the lubrication of roll neck bearings requires the use of high temperature as well as water insoluble grease.

The principal object of the present invention is the production of a grease composition which will provide adequate lubrication at high temperatures and will not increase the running torque of the mechanism lubricated at such high temperatures. Another object is to provide a high temperature grease which is stable against oil bleeding during storage. Still another object is the provision of a high temperature, water insoluble, reversible grease. Other and further objects will be apparent to those skilled in the art from the reading of the following description.

The grease compositions made in accordance with the present invention comprise essentially a lubricating mineral oil, with or without an organic compound boiling above 400° F. and containing at least one alcoholic OH group, and as the thickening agent a soap resulting from the reaction of a soap stock, a polyvalent metal hydrate, such as the hydrates of calcium, barium, strontium, magnesium and mixtures thereof, and a chlorine-containing material such as hydrochloric acid or a polyvalent metal chloride. Experience in grease making and in the use of greases has established that it is best practice to select as the lubricating oil portion of the grease, an oil of the same type as would have been selected if a liquid lubricant could be used. A wide range of lubricating oils is therefore permissible in grease production. In general, the base oil in the composition of the present invention comprises an oil having an S. U. V. in the range of from about 35–220 seconds at 210° F. However, for the production of most greases of the type contemplated by this invention, it is preferred to use a base oil having a viscosity of from 100–2400 S. U. V. at 100° F.

It has now been found that it is possible to greatly raise the dropping point of a polyvalent metal soap grease by having present during the making of the polyvalent metal soap a small quantity of chloride or halide ions. For this purpose the chloride ion can be furnished by the presence of a chlorine-containing compound like hydrochloric acid, ammonium chloride or from a polyvalent metal chloride such as barium chloride, strontium chloride, magnesium chloride, aluminum chloride or calcium chloride. From 0.1–5% of these materials based upon the weight of the eventual grease will be found to provide an adequate source of chloride ions although it is preferred to use about 0.3% by weight of the chlorine-containing compound.

It has further been found that the presence of high molecular weight alcohols or mixed alcohols such as the ether alcohols having boiling points in excess of 400° F. greatly improve the consistency or grease structure and reversibility of the grease composition. Examples of the alcohols contemplated within the scope of the present invention are hydroabietic (obtained from rosin), ethylene glycol, diethylene glycol or triethylene glycol, and branched chain alcohols such as undecyl alcohol, heptadecyl alcohol and tetradecyl alcohol. Monobutyl ether of ethylene glycol and 2-ethyl hexyl ether of ethylene glycol are representative of the ether alcohols. From 1%–10% by weight based upon the grease composition of the high boiling material may be used, it being preferred to use about 2% which has been found to give very satisfactory results.

The high temperature grease compositions of the present invention are preferably made by first preparing the soap which can be made from any of the customary soap stocks known to the trade such as fats and fatty oils like stearin, palmitin, cotton seed oil, hydrogenated fish oils, etc., or fatty acids like stearic acid, oleic, hydrogenated fish oil acids, etc. In preparing the soap, the soap stock, neutralizing or saponifying agent, material providing a source of chloride ions and a trace of water are stirred together and heated to the reaction temperature. The reaction ordinarily requires heating to a temperature of from 400°–500° F. After the soap-producing reaction has been completed, the mineral oil is stirred in, care being taken that the temperature does not fall below the range of 400°–450° F. After all the oil has been incorporated, that is, sufficient to produce a grease containing from 10–30% of soap, the high molecular weight alcohol, if desired, is added, and then the grease is permitted to cool without agitation, and after cooling to about room temperature the grease is stirred to a smooth consistency. If desired, other soaps in the nature of structure modifiers such as aluminum stearate or aluminum stearate and zinc naphthenate, in amounts up to 5%, may be included in the grease.

The following example will serve to illustrate a specific embodiment of the invention.

Example 1

| | Per cent |
|---|---|
| Hydrogenated fish oil | 20 |
| Hydrated lime | 2.9 |
| $CaCl_2.2H_2O$ | 0.3 |
| Ethylene glycol monobutyl ether | 2 |
| Lubricating oil (300 vis. S. S. U. at 100° F.) | 74.8 |

In compounding the grease the hydrogenated fish oil, calcium hydroxide, calcium chloride and a trace of water were stirred and slowly heated to 450° F. Without the calcium chloride present, reaction takes place at temperatures below 300° F., but with calcium chloride present, it is necessary to heat the product to 450° F. to form a calcium soap. It is thus indicated that the calcium chloride is an integral part of the soap structure. After all the water had been removed at 450° F. the mineral oil was stirred in at such a rate that the temperature did not fall below 400°–450° F. After the oil was added, the ethylene glycol monobutyl ether was added, and the grease was permitted to cool without agitation to room temperature and then stirred to a smooth grease consistency. It might be thought that the calcium chloride would give rise to corrosion if water is present, but such has not been found to be the case. For example, an ordinary lime soap grease and a grease prepared as above were coated on freshly sand blasted steel panels, and then stored in a cabinet held at 100° F. with 100% relative humidity, fresh humidified air being constantly passed in. After 7 days in the cabinet neither panel showed any rust spots.

Grease made in the manner indicated above can be melted and on cooling will not separate into its component parts, such as oil and soap, but will remain homogeneous, and on working again assumes a normal grease structure. These greases have been remelted as much as three times without any deleterious effects, the composition having a definite grease structure similar to that of the original greases after each melting.

The above grease has a melting point of 375° F. whereas a conventional lime soap grease, containing the same amount of soap and water as a stabilizer, has a melting point of 190–200° F.

If desired anti-weld or extreme pressure agents containing sulfur, chlorine, or phosphorus, lead soaps, choloroxanthates, mercaptides may be incorporated in the grease. Also stringiness agents such as hydrocarbon or ester polymers, anti-oxidants such as naphthols, naphthylamine, alkylated phenols, dyes, graphite, zinc or titanium oxide may be added to the product.

What I claimed is:

1. An anhydrous, high temperature reversible grease composition comprising a mineral lubricating oil and a soap consisting of the reaction product of a soap stock and a polyvalent metal hydrate heated to a temperature of 400° to 500° F.; and 0.1–5% of a chlorine-containing material selected from the group consisting of HCl and polyvalent metal halide, said chlorine containing material being incorporated as a substantially water insoluble integral part of said soap and being effective to raise the reaction temperature of formation of said soap substantially above the reaction temperature of similar soaps free of said chlorine containing material.

2. An anhydrous, high temperature reversible grease composition comprising a mineral lubricating oil, an organic compound boiling above 400° F. and containing at least one alcoholic OH group and a soap consisting of the reaction product of a soap stock and a polyvalent metal hydrate heated to a temperature of 400° to 500° F.; and 0.1-5% of a chlorine-containing material selected from the group consisting of HCl and polyvalent metal chloride, said chlorine containing material being incorporated as a substantially water soluble integral part of said soap and being effective to raise the reaction temperature of formation of said soap substantially above the reaction temperature of similar soaps free of said chlorine containing material.

3. An anhydrous high temperature reversible grease composition comprising a mineral lubricating oil, an organic compound boiling above 400° F. and containing at least one alcoholic OH group and 10-30% of a soap consisting of the reaction product of a soap stock and a polyvalent metal hydrate heated to a temperature of 400° to 500° F.; and 0.1-5% of a chlorine-containing material selected from the group consisting of HCl and polyvalent metal chloride, said chlorine containing material being incorporated as a substantially water insoluble integral part of said soap and being effective to raise the reaction temperature of formation of said soap substantially above the reaction temperature of similar soaps free of said chlorine containing material.

4. An anhydrous high temperature reversible grease composition comprising a mineral lubricating oil, an organic compound boiling above 400° F., containing at least one alcoholic OH group and 15% by weight of a soap consisting of the reaction product of a soap stock and a polyvalent metal hydrate heated to a temperature of 400° to 500° F.; and 0.1-5% of a chlorine-containing material selected from the group consisting of HCl and polyvalent metal chloride, said chlorine containing material being incorporated as a substantially water insoluble integral part of said soap and being effective to raise the reaction temperature of formation of said soap substantially above the reaction temperature of similar soaps free of said chlorine containing material.

5. An anhydrous high temperature reversible grease composition comprising a mineral lubricating oil and 15% of a soap consisting of the reaction product of a soap stock and a polyvalent metal hydrate heated to a temperature of 400 to 500° F.; and 0.1-5% of a chlorine-containing material selected from the group consisting of HCl and polyvalent chloride, said chlorine containing material being incorporated as a substantially water insoluble integral part of said soap and being effective to raise the reaction temperature of formation of said soap substantially above the reaction temperature of similar soaps free of said chlorine containing material.

6. An anhydrous high temperature reversible grease composition comprising a mineral lubricating oil, and 10-30% of the reaction product of hydrogenated fish oil and hydrated lime heated to a temperature of 400° to 500° F.; and .3% calcium chloride, said calcium chloride being incorporated into said reaction product as a water insoluble integral part thereto and being effective to raise the reaction temperature of formation of said reaction product.

7. An anhydrous high temperature reversible grease composition comprising a mineral lubricating oil, an organic compound boiling above 400° F. containing at least one alcoholic OH group and 10-30% of the reaction product of hydrogenated fish oil and hydrated lime heated to a temperature of 400° to 500° F.; and .3% calcium chloride, said calcium chloride being incorporated into said reaction product as a water insoluble integral part thereto and being effective to raise the reaction temperature of formation of said reaction product.

8. An anhydrous high temperature reversible grease composition comprising a mineral lubricating oil and 15% by weight of the reaction product of hydrogenated fish oil and hydrated lime heated to a temperature of 400° to 500° F.; and .3% calcium chloride, said calcium chloride being incorporated into said reaction product as a water insoluble integral part thereto and being effective to raise the reaction temperature of formation of said reaction product.

9. An anhydrous high temperature reversible grease composition comprising a mineral lubricating oil, an organic compound boiling above 400° F. and containing at least one alcoholic OH group and 15% by weight of the reaction product of hydrogenated fish oil and hydrated lime heated to a temperature of 400° to 500° F.; and .3% calcium chloride, said calcium chloride being incorporated into said reaction product as a water insoluble integral part thereto and being effective to raise the reaction temperature of formation of said reaction product.

GEORGE M. McNULTY.
JOHN C. ZIMMER.

REFERENCES CITED

The following references are of record in the file of this patent:

UNITED STATES PATENTS

| Number | Name | Date |
| --- | --- | --- |
| 1,989,197 | Hilliker | Jan. 29, 1935 |
| 2,031,368 | Hodson | Feb. 18, 1936 |
| 2,071,488 | Zimmer et al. | Feb. 23, 1937 |
| 2,339,715 | McOmie | Jan. 18, 1944 |
| 2,396,744 | Morway | Mar. 19, 1946 |

FOREIGN PATENTS

| Number | Country | Date |
| --- | --- | --- |
| 7,481 | Great Britain | 1904 |
| 340,294 | Great Britain | 1931 |
| 348,642 | Great Britain | May 11, 1931 |
| 323,906 | Germany | Aug. 10, 1920 |